(12) United States Patent  
Kay (10) Patent No.: US 8,664,866 B2  
(45) Date of Patent: Mar. 4, 2014

(54) SOLAR POWERED LAMP WITH BRIGHTNESS CONTROL

(76) Inventor: Ek Khoon Hobart Kay, Singapore (SG)

( * ) Notice: Subject to any disclaimer, the term of this patent is extended or adjusted under 35 U.S.C. 154(b) by 261 days.

(21) Appl. No.: 13/061,133

(22) PCT Filed: Jan. 14, 2011

(86) PCT No.: PCT/SG2011/000017
§ 371 (c)(1),
(2), (4) Date: Feb. 26, 2011

(87) PCT Pub. No.: WO2012/096627
PCT Pub. Date: Jul. 19, 2012

(65) Prior Publication Data
US 2012/0181938 A1   Jul. 19, 2012

(51) Int. Cl.
*H05B 37/02* (2006.01)
(52) U.S. Cl.
USPC .......................... 315/159; 315/152; 315/291
(58) Field of Classification Search
USPC .......... 315/149–159, 291, 294, 307; 362/183, 362/290
See application file for complete search history.

(56) References Cited

U.S. PATENT DOCUMENTS

| | | | | |
|---|---|---|---|---|
| 7,988,320 | B2* | 8/2011 | Brumels | 362/192 |
| 8,166,701 | B1* | 5/2012 | Duff, Sr. | 47/39 |
| 8,203,285 | B2* | 6/2012 | Chen | 315/307 |
| 2005/0117344 | A1* | 6/2005 | Bucher et al. | 362/290 |
| 2006/0208653 | A1* | 9/2006 | Crawford | 315/150 |
| 2007/0002561 | A1* | 1/2007 | Tesmer et al. | 362/183 |
| 2008/0074867 | A1* | 3/2008 | Chen | 362/183 |
| 2011/0170283 | A1* | 7/2011 | Chan | 362/183 |

* cited by examiner

*Primary Examiner* — Tung X Le (57) ABSTRACT

The present invention describes a solar powered garden lamp (100,100a,100b). The lamp (100,100a,100b) includes a lamp assembly, a solar panel (192), a rechargeable battery (150), a sunlight-hour switch (154), an LED (146a,146b) and a control circuit (140). In use, a user estimates the number of hours of sunlight incident on the solar panel (192) and the sunlight-hour switch (154) is calibrated by applying a weather variability factor on a battery charger (142) capacity that is connected to the solar panel. The solar panel (192) converts solar energy into electric power to recharge the battery (150) during the day so that the battery (150) has sufficient power to light up the LED (146a or 146b) at a predetermined brightness continuously from dusk to dawn.

6 Claims, 9 Drawing Sheets

SOLAR POWERED LAMP WITH BRIGHTNESS CONTROL

RELATED APPLICATION

This application is a national stage of international patent application no. PCT/SG2011/000017 filed on Jan. 14, 2011 with the Intellectual Property Office of Singapore as the Receiving Office.

FIELD OF INVENTION

The present invention relates to a solar powered lamp with a brightness control switch and a brightness control circuit. The brightness control circuit is set to ensure consistent optimum output power during the night by adjusting the brightness control switch to correspond with the hours of sunlight incident on the solar panel of the lamp during the day for recharging its battery.

BACKGROUND

Figure 1:
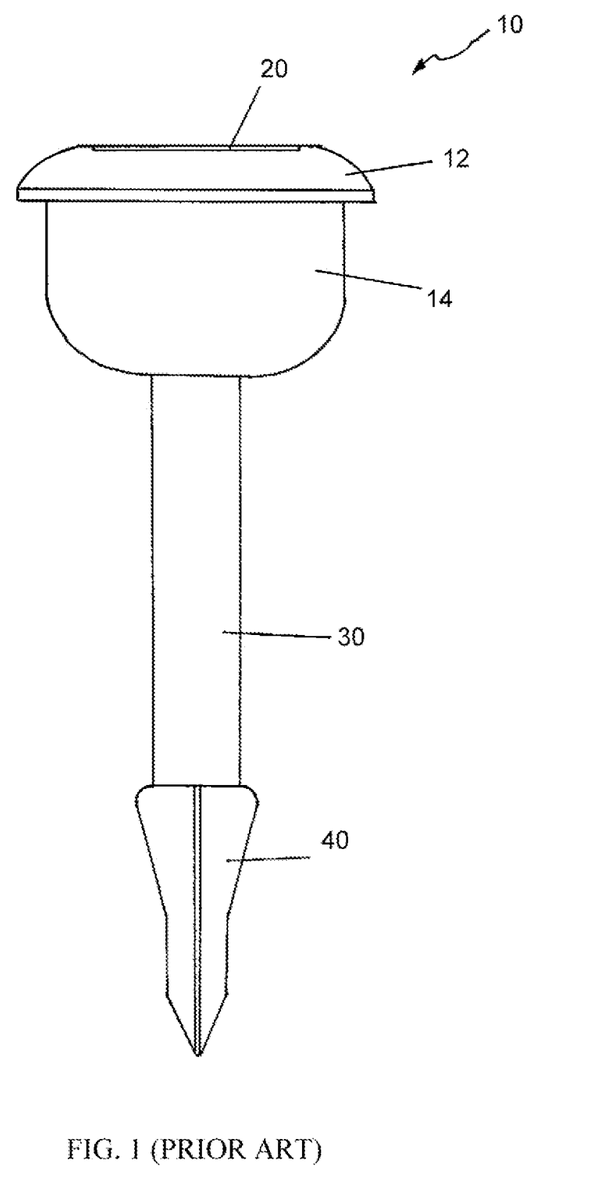
FIG. 1 illustrates a known garden solar powered lamp.

FIG. 1 illustrates the use of a conventional solar powered garden accent lamp 10 to light up one's walkway and/or decorate one's garden at night. As shown in FIG. 1, each garden lamp 10 comes with a body 12 and a lampshade 14. The body 12 includes an LED, rechargeable battery, a solar panel 20 and a built-in battery charger. The body 12 also comes with a post 30 and a spike 40; the spike 40 allows one to drive the spike and post into the ground for installing the lamp 10 to light up one's garden without having to run electrical cables below the ground surface. However, users are often disappointed with the performance of these garden lamps 10 because the light from these conventional lamps does not maintain constant brightness from dusk to dawn, especially during winter when daylight is short. Another shortcoming is that the post and spikes can be easily pulled out and the lamps be stolen.

It can thus be seen that there exists a need for another solar powered garden lamp that improves on the performance of the existing garden lamps and yet has additional features to discourage theft.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention seeks to provide a solar powered lamp that allows it to illuminate at a sustainable predetermined brightness continuously from dusk to dawn by optimising the brightness level with the number of hours of sunlight incident on its solar panel. This is done by calibrating the brightness control switch or daylight-hour switch to correspond with the number of hours of sunlight incident on the solar panel. To compensate for variability of weather conditions, calibration of the sunlight-hour switch takes into account a compensation factor which is applied to the capacity of a battery charger connected to the solar panel.

In one embodiment, the present invention provides a solar powered lamp. The solar powered lamp comprises: a solar panel; a light sensor integrally built-in with the solar panel with predetermined dusk to dawn settings; a control circuit comprising a battery charger, a brightness adjust circuit and an ON/OFF control circuit; a sunlight-hour switch connected to the brightness adjust circuit and ON/OFF circuit; an LED lamp; and a rechargeable battery connected between the battery charger and the LED lamp; wherein the sunlight-hour switch is calibrated according to the number of hours of sunlight incident on the solar panel and the brightness adjust circuit is set so that the LED bulb is illuminated at a predetermined brightness continuously from dusk to dawn.

In another embodiment of the solar powered lamp, calibration of the sunlight-hour switch comprises a weather variability compensation factor being applied to a capacity of the battery charger. In another embodiment, the control circuit comprises an under-voltage protection circuit disposed between the battery charger and the brightness adjust circuit. In another embodiment, the sunlight-hour switch is a slider, dial/rotary or membrane type. In other embodiments, the solar powered lamp comprises a lampshade, a post connected to the lampshade, a spike or a wall mounting adaptor connected to a distal end of the post. The spike may comprise a flange and skewers planted through holes in the flange.

In another embodiment, the present invention provides a solar powered lighting kit. The kit comprises: a lamp comprising a lampshade and a cap assembly disposed on top of the lampshade; a solar panel with an integral light sensor operable to mount on top of the cap assembly; an LED lamp; a control board comprising a battery charger and an LED controller, with the LED controller comprising a brightness adjust circuit and an ON/OFF control circuit; and a sunlight-hour switch calibrated to number of hours of sunlight incident on the solar panel at the lamp's installed location.

BRIEF DESCRIPTION OF THE DRAWINGS

This invention will be described by way of non-limiting embodiments of the present invention, with reference to the accompanying drawings, in which.

DETAILED DESCRIPTION

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

Figure 2A:
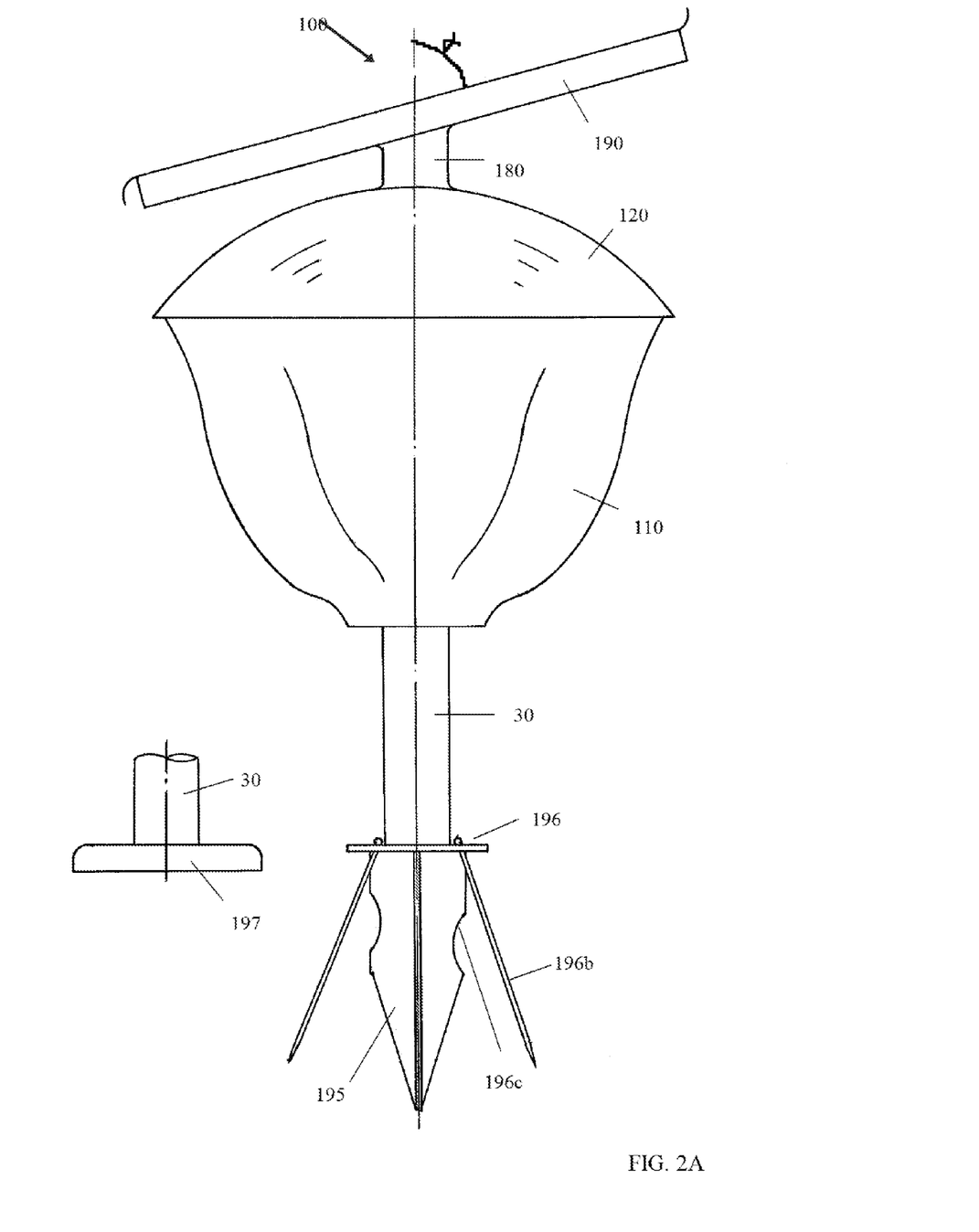
FIG. 2A illustrates a solar powered lamp according to an embodiment of the present invention.

FIG. 2A shows a side view of a solar powered lamp 100 according to an embodiment of the present invention; for illustration, a garden accent lamp is described. As shown in FIG. 2A, the solar powered lamp 100 has a lampshade 110 and a cap assembly 120 fitted on top of the lampshade 110. A stem 180 extends from a top of the cap assembly 120 to support a solar panel assembly 190. The solar panel assembly 190 is mounted at a fixed angle, alpha, to a vertical axis of the solar powered lamp 100; preferably, alpha ranges from about 40 to about 70 degrees. A lower part of the lampshade 110 has a spigot 116 (shown more clearly in FIG. 3A) for removeable connection with the post 30. The distal end of the post 30 may be fitted with a ground spike 195 or a wall adaptor 197. The spigot 116 has a circumferential groove 117 and in use, a screw 117a is threaded through a thickness of the post 30 and the screw's threaded end extends into the circumferential groove 117 so that the lampshade 110 cannot be removed from the post 30 without the use of a screw driver or Allen key. The circumferential groove 117 and the screw allow the solar powered lamp 100 to be rotatory orientated towards the sun rays. The post 30 and spike 195 are separate pieces but are joined through a pipe and sleeve type of connection. To discourage vandalism, a screw is also used to secure the pipe/sleeve connection. The upper end of the spike 195 has a flange 196, which has four holes, with each hole being dimensioned to accept a skewer 196b. The skewers 196b are pushed into the ground but at oblique angles so that they provide resistance when the post 30 and spike 195 are being pulled out from the ground. As shown in FIG. 2A, each of the four ribs of the spike 195 has a notch 196c; after the post 30 and spike 195 are driven into the ground, the soil consolidating around the notches 196c provides pull-out resistance in addition to that provided by the skewers 196b. Preferably, the notches 196c on the spike 195 are axially staggered, as shown in FIG. 2A.

In another embodiment, flange 196a is supplied as a separate piece from the spike 195. The flange 196a has a centre hole to allow this flange to be fitted between the spike 195 and the post 30 to serve as an anchor plate for the skewers 196b just like the above embodiment.

In another embodiment (not shown in the figures), the lower part of the lampshade 110 has a blind hole 116a (instead of a projecting spigot) for removeable connection with the post 30. A threaded hole 117b relatively smaller than the blind hole 116a is provided transverse to the blind hole 116a. In use, a screw 117a is screwed into the threaded hole 117b so that the screw's threaded end goes through an aperture on the post 30 to make it difficult for one to remove the lampshade 110 from the post 30 without use of a screwdriver or Allen key.

Figure 2B:
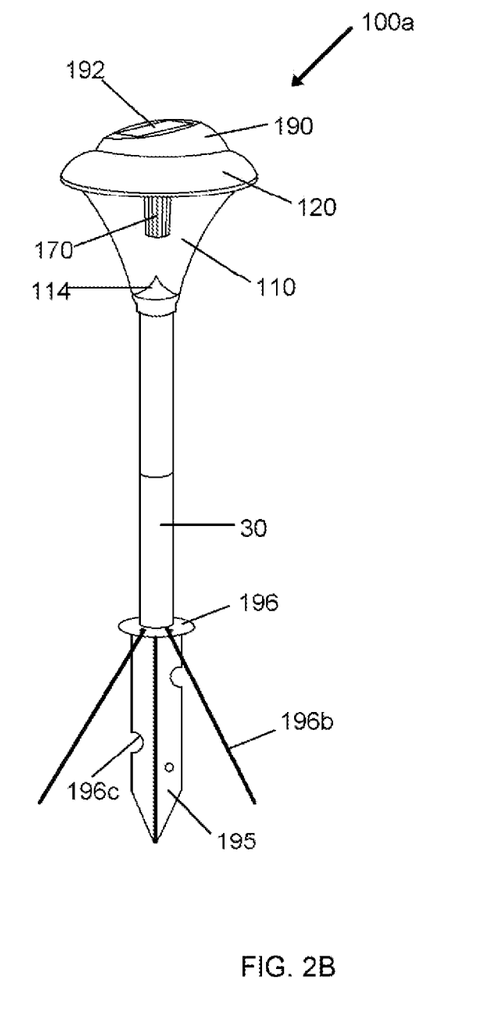
FIG. 2B illustrates a variation of the solar powered lamp of the present invention.

FIG. 2B shows a variation 100a of the solar powered lamp 100 of the present invention. As shown in FIG. 2B, the solar powered lamp 110a is similar to the previous embodiment except that the solar panel assembly 190 is integrally formed with the cap assembly 120. In addition, the post 30 is shown to consist of two sections; the joint at the two sections allow the solar powered lamp 100a to be rotatory orientated so that the solar panel 192 can be orientated to directly face the sun rays. The rest of the parts of the lamp 100a are similar to those of the previous embodiment and no further descriptions are necessary.

Figure 3A:
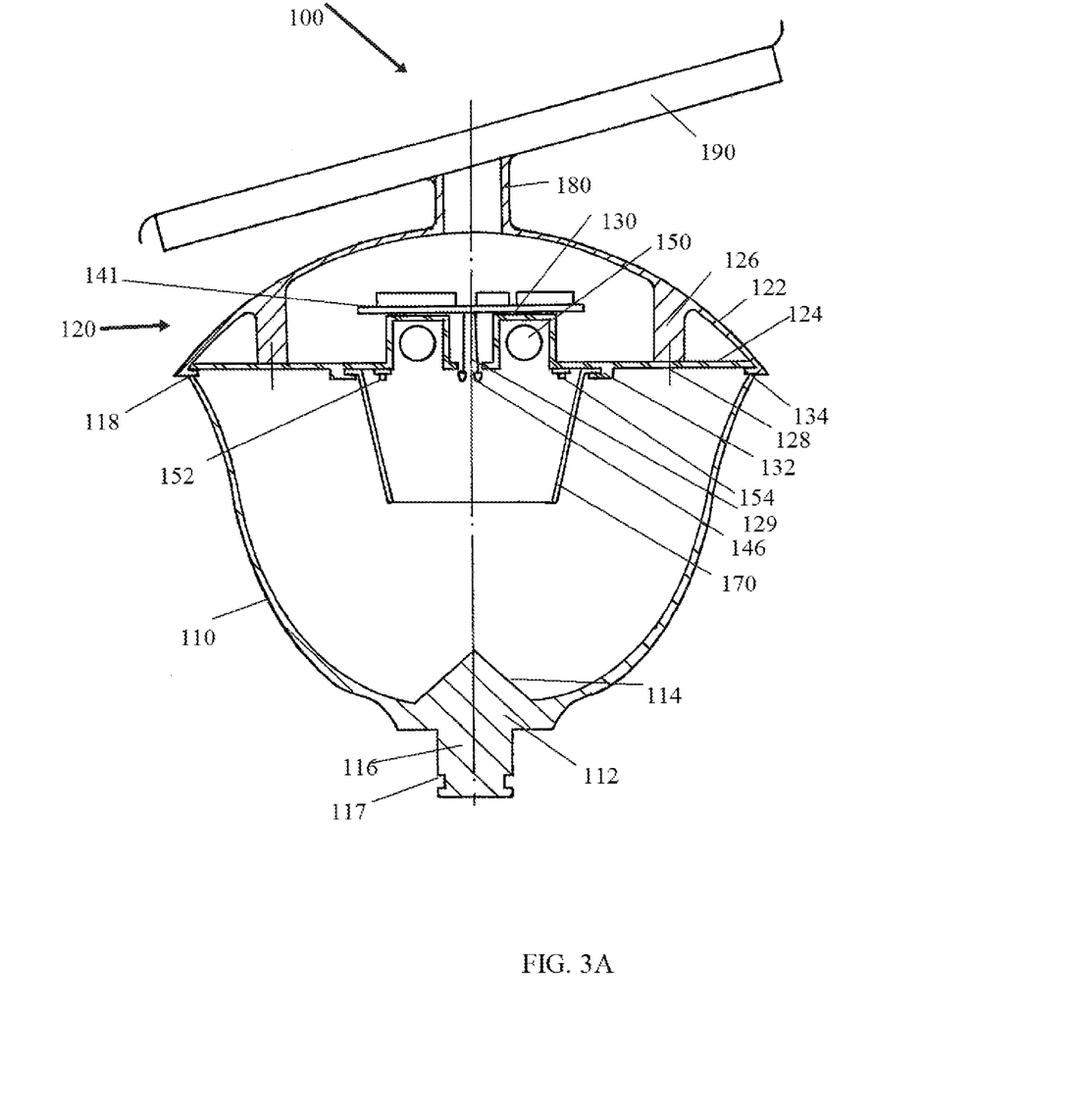
FIG. 3A illustrates a cross sectional view of the solar powered lamp shown in FIG. 2A (not shown with post and spike)

FIG. 3A shows a cross-sectional view of the solar powered lamp 100 shown in FIG. 2A. As shown in FIG. 3A, the lampshade 110 is an open top, funnel shaped glass and its top side has a rim 118. The rim 118 has outward projecting flanges 119. The bottom or base 112 of the lampshade 110 is closed and the inside bottom has a conical reflector 114, whilst the spigot 116/blind hole 116a is located on an external part of the base 112 such that the longitudinal axes of the spigot 116/blind hole 116a and the lampshade 110 are co-axial. Removeably connected to the rim 118 and outward projecting flanges 119 is the cap assembly 120.

In one embodiment, the lampshade 110 is made of tempered glass, which is preferably arsenic-free. The lampshade 110 glass may be transparent, translucent or frosted.

The cap assembly 120 includes a cap 122 and a closure plate 124. The cap 122 has a shape that forms part of a hemisphere. An inside surface of the cap 122 has four extending posts 126 for supporting the closure plate 124 when the cap 122 and closure plate 124 are assembled together. For attaching the closure plate 124 onto the post 126, the closure plate 124 has four holes 128 in register with the posts 126; each hole 128 is dimensioned to accept a screw, such as an M4 size self-tapping screw.

Figure 3B:
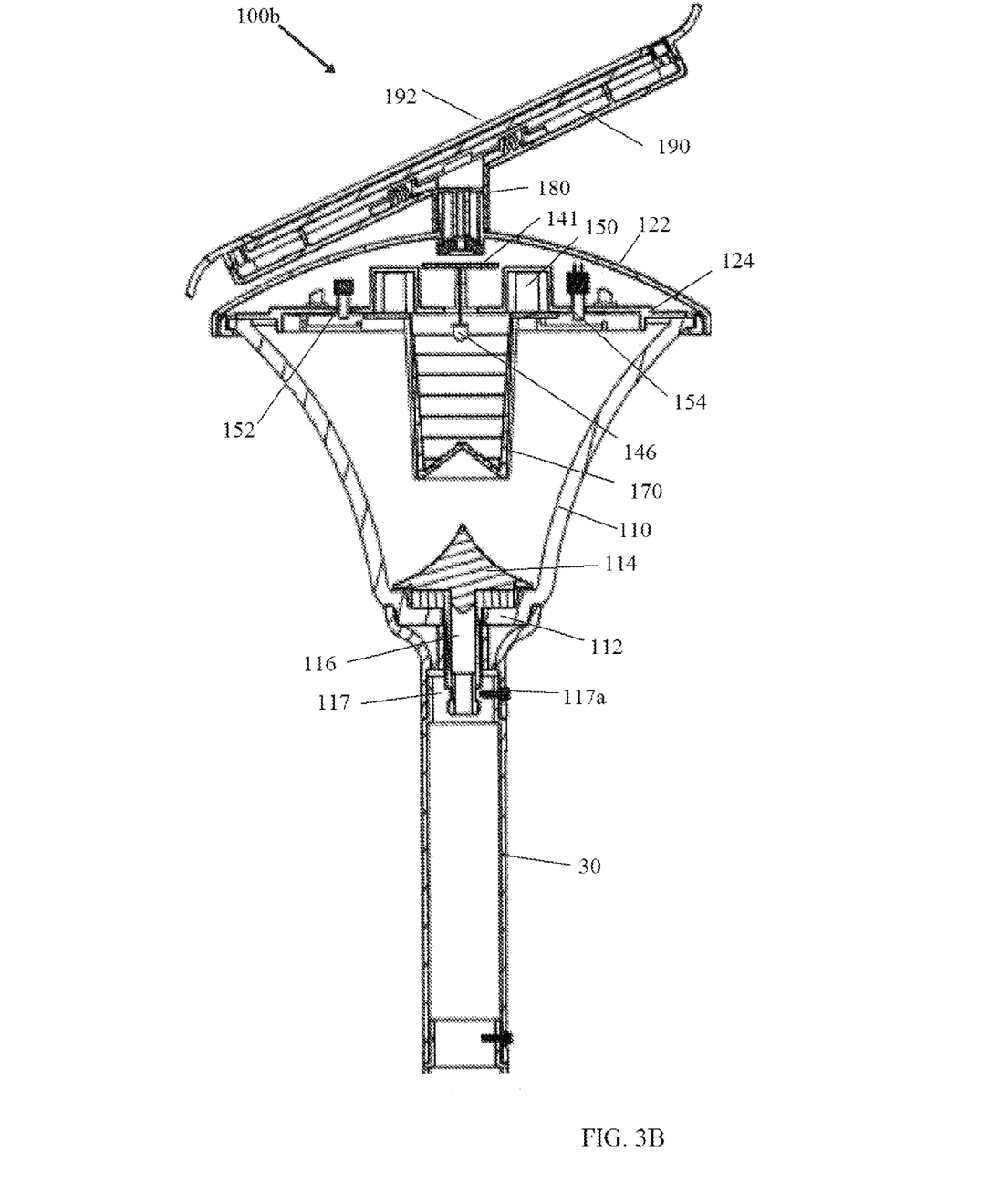
FIG. 3B illustrates a variation of the solar powered lamp of the present invention.

FIG. 3B shows a variation 100b of the solar powered lamp of the present invention. The solar powered lamp 100b is similar to the earlier embodiment and the parts have been given similar reference numerals except that the conical reflector 114 and the spigot 116 are integrally formed and the spigot 116 is disposed in an aperture at the base 112 of the lampshade 110. As in the earlier embodiment, near the end of the spigot 116 is a circumferential groove 117, which cooperates with screw 117a to allow the solar panel 192 to be rotatory orientated towards the sun rays. In addition, the screw 117a locks the lamp to the post 30 so that the lamp cannot be removed from the post without the use of a screw driver or Allen key.

Figure 4:
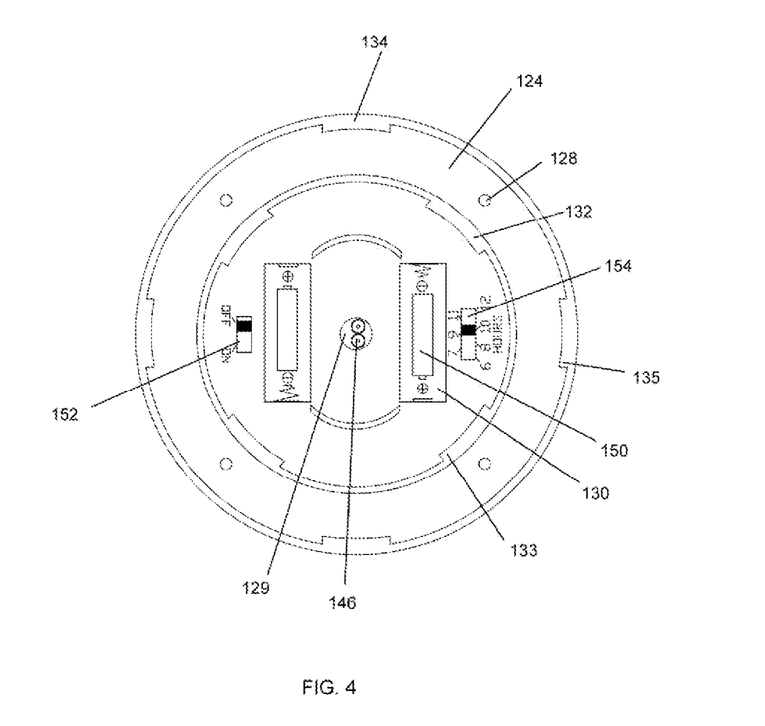
FIG. 4 illustrates a bottom view of a top closure plate of the solar powered lamp shown in FIG. 2A or 2B.

FIG. 4 shows a bottom view of the closure plate 124 for use with the solar powered lamp shown in FIG. 2A, 2B or 3B. As shown in FIG. 4, the centre of the closure plate 124 has an aperture 129. Diametrally opposed to the centre aperture 129 are two rectangular battery receptacles 130. Each battery receptacle 130 opens downwards so that a battery 150 disposed in each battery receptacle 130 is replaceable by disconnecting the lampshade 110 from the cap assembly 120. Each battery receptacle 130 is sized and dimensioned to receive a rechargeable battery, such as an AA, C or D size. Also on the lower surface of the closure plate 124, there are two rows of four inward-projecting flanges 132, 134. The inward-projecting flanges 134 are equally spaced apart and are located around the periphery of the closure plate 124. Similarly, the four inward-projecting flanges 132 are also equally spaced apart but are located along a circle that is smaller than the pitch circle diameter of the screw holes 128. Preferably, the inward-projecting flanges 132,134 are staggered in a radial manner as shown in FIG. 4. One end of each inward-projecting flange 132, 134 is open whilst the opposite end has an end abutment 133, 135. By relative rotation of the lampshade 110 and the closure plate 124 (or cap assembly 120), the outward-projecting 119 and inward-projecting flanges 134 are engaged or disengaged so that the lampshade 110 and the cap assembly 120 are removeably connected.

As shown in FIG. 3A, the inward-projecting flanges 132 are engageable with outward-projecting flanges 172 disposed along a top rim of a frustoconical diffuser 170; by relative angular rotation of the frustoconical diffuser 170 and closure plate 124, the inward projecting flanges 132 and outward projecting flanges 172 are engaged or disengaged so that the frustoconical diffuser 170 and the closure plate 124 are removeably connected. The frustoconical diffuser 170 allows light, emitted from an LED 146a,146b extending through the centre aperture 129, to concentrate and be directed down onto the conical reflector 114 so that the light shining through the lampshade 110 is even and diffused.

Figure 5A:
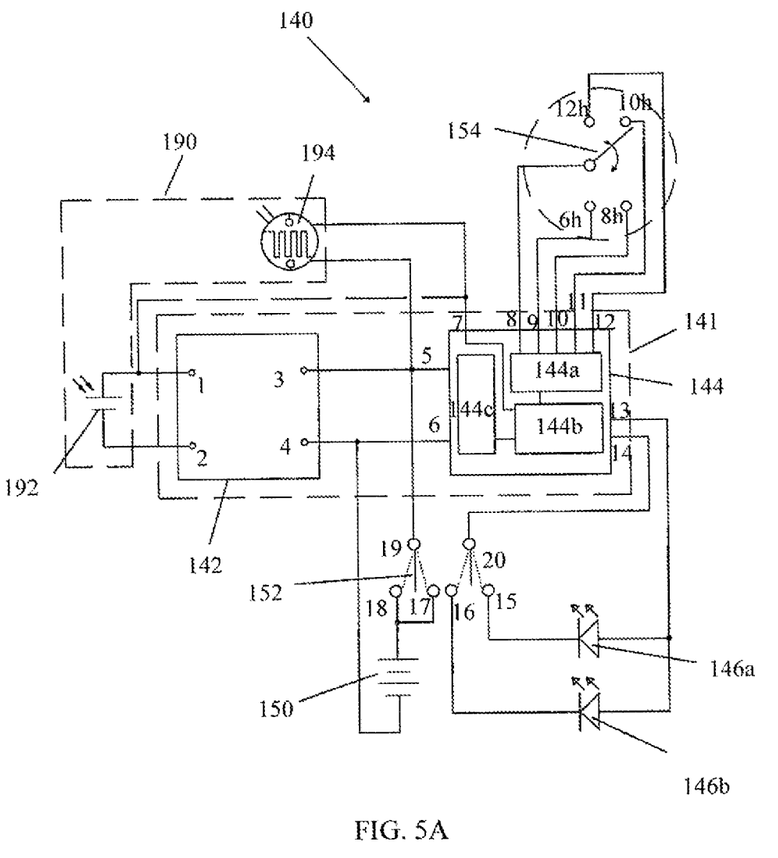
FIG. 5A illustrates schematic of a lamp control circuit used in the solar powered lamp shown in FIG. 2A or 2B.
Figure 5B:
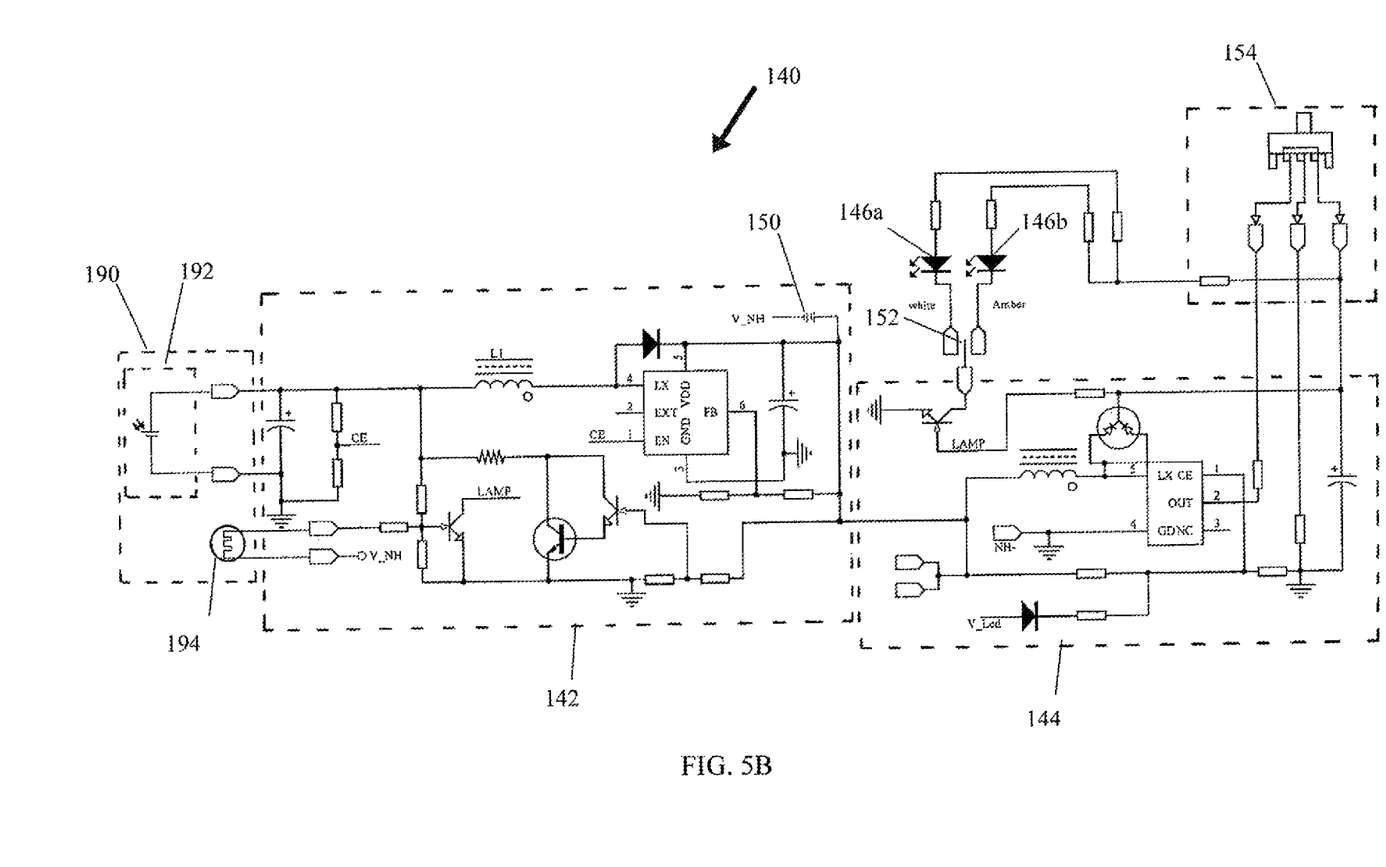
FIG. 5B illustrates an implementation of the control circuit.
Figure 6A:
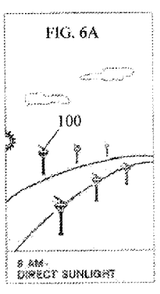
FIGS. 6A-6G illustrate the solar powered lamp being installed in a wide open space with sunlight incident on the solar panel from 8 am to 6 pm.
Figure 6B:
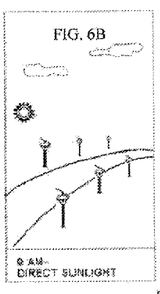
Figure 6C:
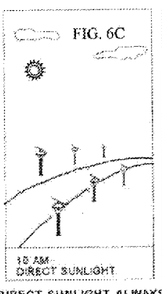
Figure 6D:
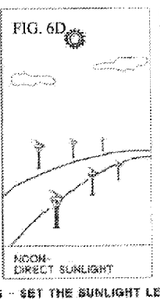
Figure 6E:
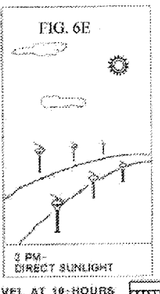
Figure 6F:
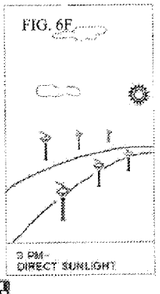
Figure 6G:
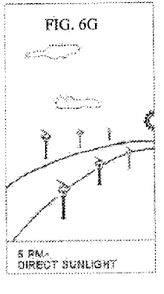
Figure 7A:
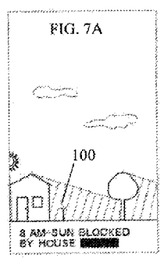
FIGS. 7A-7G and 8A-8G illustrate the solar powered lamp being installed near one's house with different number of hours of non-shaded sunlight incident on the solar panel.
Figure 7B:
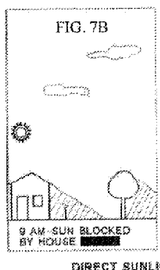
Figure 7C:
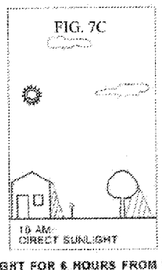
Figure 7D:
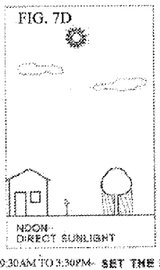
Figure 7E:
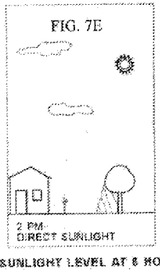
Figure 7F:
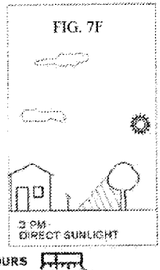
Figure 7G:
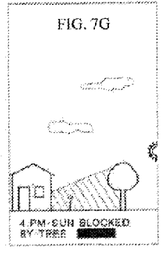
Figure 8A:
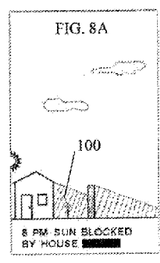
Figure 8B:
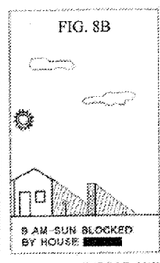
Figure 8C:
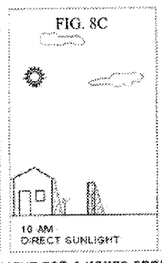
Figure 8D:
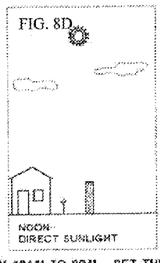
Figure 8E:
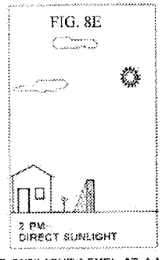
Figure 8F:
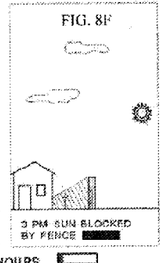
Figure 8G:
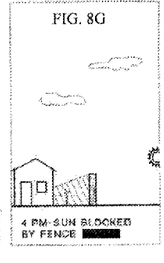

Also as shown in FIG. 3A, a control board 141 is disposed in a void space between the cap 122 and the closure plate 124. The control board 141 is preferably mounted horizontally in the void space such that the LEDs 146a, 146b extend down through the central aperture 129. On the control board 141 is mounted a battery charger 142 and a LED controller 144. FIG. 5A shows schematic of a lamp control circuit 140 comprising the control board 141. FIG. 5B shows an implementation of the lamp control circuit 140. As shown in FIG. 5A, the LED controller 144 includes three circuits, namely, a brightness adjust circuit 144a, an ON/OFF control circuit 144b and an under-voltage protection circuit 144c. Also as shown in FIG. 5A, the solar panel assembly 190 includes the solar panel 192 and an integrated light sensor 194. The terminals of the solar panel 192 are connected to terminals 1 and 2 of the battery charger 142, with the terminal 1 also connected to terminal 7 of the LED controller 144 and one terminal of the light sensor 194; the other terminal of the light sensor 194 is connected to terminal 3 of the battery charger 142, terminal 5 of the LED controller 144 and terminates at a terminal 19 of a double-throw LED selector switch 152. Terminals 3 and 4 of the battery charger 142 are connected to terminals 5 and 6 of the LED controller 144. Terminals 8 to 12 of the LED controller 144 are connected to the respective relevant terminals of a sunlight-hour switch 154. The output terminal 13 of the LED controller 144, linked directly to the ON/OFF control circuit 144b, is connected to the anode ends of the two LEDs 146a, 146b. The cathode ends of the two LEDs 146a,146b are connected separately to terminals 15 and 16 of the LED selector switch 152, such that the LEDs 146a,146b are in parallel and either LED is turned on by activating the LED selector switch 152. Terminals 17 and 18 of the LED selector switch 152 are connected to the positive terminals of two batteries 150, which are connected in parallel in the battery receptacles 130. The negative terminals of the batteries 150 are connected to terminal 4 of the battery charger 142.

In use, the light sensor 194 on the solar panel 192 automatically detects the onset of dusk or dawn. At dawn, the light sensor 194 outputs a voltage signal that is higher than a voltage threshold set in the under-voltage protection circuit 144c; this deactivates the under-voltage protection circuit 144c, turns OFF the control circuit 144b and activates the battery charger 142 to start charging the battery 150. At dusk, the light sensor 194 outputs a voltage signal that is lower than the voltage threshold set in the under-voltage protection circuit 144c; this activates the under-voltage protection circuit 144c and prevents the charge in the battery 150 from dissipating through the battery charger 142 and solar panel 192; at the same time, the control circuit 144b is turned ON and either LED 146a,146b is illuminated.

In one embodiment, the LED selector switch 152 is disposed on a lower surface of the closure plate 124 near to the left hand side battery receptacle whilst the sunlight-hour switch 154 is disposed near the right hand side battery receptacle, as seen in FIG. 4. The LED selector switch 152 and sunlight-hour switch 154 are located inside the frusto-conical diffuser 170. In another embodiment (not shown in the figures), the LED selector switch 152 and sunlight-hour switch 154 are located outside the frustoconical diffuser 170 for easy user access.

As shown in FIG. 5A, the sunlight-hour switch 154 has a number of discrete switching positions and comprises a plurality of dimming-bits. Each switching position is calibrated according to a predetermined number of hours, for example, from 4 to 12 hours, of direct or unshaded sunlight incident on the solar panel 192; in other words, the sunlight-hour switch 154 is set according to the number of available non-shaded sunlight falling on the solar panel 192. Solar energy absorbed by the solar panel 192 is then converted into electric power and the battery charger 142 recharges power into the battery 150. In another embodiment, the sunlight-hour switch 154 is continuously variable and it is graduated with a calibration scale, for example, from 4 to 12 hours. In either embodiment, the sunlight-hour switch 154 may be a dial/rotary type or a slider type. In yet another embodiment (not shown in the figures), the sunlight-hour switch 154 is made up of a membrane switch and a setting indicator; by momentarily pressing the membrane switch, the setting indicator shows a bar with its length corresponding to the number of hours of non-shaded sunlight that is incident on the solar panel 192 at its installed location.

A reader will realise that electric charges in the battery 150 is directly related to the amount of sunlight incident on the solar panel 192. For example, with more sunlight available at the lamp's installed location, more electric charges are delivered into the battery 150 and the solar powered lamp 100, 100a,100b can be set brighter to take advantage of more available power from the battery. However, the amount of sunlight available during a day can vary widely on the lamp's location. The lamp may lay in shadows cast by buildings, vegetation and other objects during different times of the day. In addition, the amount of sunlight available also varies with the seasons, with long hours during summer and short hours during winter. FIGS. 6A-6G illustrate the solar powered lamp 100,100a,100b being installed in a wide open space and sunlight incident on the solar panel 192 is available from 8 am to 6 pm, ie. for a period of about 10 hours. With this sunny condition, the sunlight-hour switch 154 is set to 10 hours and the LED 146a,146b is illuminated at a corresponding predetermined brightness that is optimum and consistently bright throughout the night. FIGS. 7A-7G illustrate the solar powered lamp 100,100a,100b being installed in one's garden. As shown in FIGS. 7A-7G, the solar powered lamp is in the shadow of the house or vegetation during certain times of the day and sunlight incident on the solar panel 192 is available from about 9:30 am to about 3:30 pm, ie. for a period of about 6 hours; in this condition, the sunlight-hour switch 154 is set to 6 hours and the LED 146a,146b is illuminated at an optimum and consistent brightness throughout the night. FIGS. 8A-8G illustrate the solar powered lamp being installed in one's garden and sunlight is incident on the solar panel 192 from 10 am to 2 pm due to shadows of house and fence; in this condition, the sunlight-hour switch 154 is set to 4 hours so that the LED 146a,146b is illuminated at an optimum and consistent brightness throughout the night. A reader will now realise that if the LED 146a,146b is set at a high brightness level (ie. high current consumption rate) and incident sunlight is limited, the amount of battery power used up in the previous night will not be sufficiently replenished and illumination of the solar powered lamp 100,100a,100b cannot be sustained for long. If the LED brightness is set at a low level (ie. low current consumption rate) and there is plenty of incident sunlight, the lamp is not put to efficient use as the amount of electric power generated by the solar panel could power the LED at a brighter level. Further setting of the sunlight-hour switch 154 is described with test data on two sizes of the solar panel 192 and different brightness settings or current consumption rates.

In one embodiment, the solar panel 192 is made from mono-crystalline, polycrystalline or amorphous silicon. Two mono-crystalline silicon solar panel 192 sizes are used to illustrate performance of the solar powered lamp 100,100a, 100b: about 81×82 mm² and about 115×162 mm² in area, with respective rated output of about 125 mAh and 280 mAh at 4V. Table 1 shows performance of the 81×82 mm² solar panel in terms of the lamp brightness expressed in LED current consumption rate (in mA/h), the corresponding diameter of illumination around the lamp 100 and charging rate of charger 142, with the lamp operating for about 12 hours. The batteries 150 are nickel metal hydride rechargeable type, rated at 1.2 V and 2000 mAh capacity but are connected in series.

TABLE 1

Performance of solar powered lamp equipped with 81 × 82 mm² solar panel

| LED Consumption rate (mA/h) | Charging rate (h) | Illumination diameter (m)(ft) | Battery reserve (h) |
|---|---|---|---|
| 5 | 1.08 | 1.4 (4.5) | 375 |
| 6 | 1.3 | 1.8 (5.9) | 310 |
| 8 | 1.73 | 2.4 (7.8) | 230 |
| 10 | 2.16 | 2.7 (8.8) | 182 |
| 15 | 3.24 | 2.8 (9.1) | 119 |
| 20 | 4.32 | 2.9 (9.5) | 89 |

The charging rate is the number of hours of sunlight incident on the solar panel 192 required to recharge and replenish the current consumed by the LED 146a,146b during the previous night. The battery reserve indicates the number of hours of battery power available to illuminate the LED at different brightness/consumption levels after the battery 150 is fully charged. The battery reserves thus allow the LED to be powered up during periods of bad weather until sunny weather returns.

Solar powered lamp 100,100a,100b using the small solar panel is suitable for use in places near the equator where there is sunny weather during at least one third of the time and the nights are about 12 hours long. Based on the assumption that there is sunny weather about one third of the time, the number of sunny days will have to compensate for the bad weather days at the rate of 3 to 1. Hence, the sunlight-hour switch 154 is calibrated with the number of hours of incident sunlight multiplied by 3, ie. the weather variability compensation factor. For example, by taking the minimum illumination diameter to be 1.8 m around the lamp 100,100a,100b, Table 1 shows the LED consumption is set at 6 mA/h and the corresponding charging rate is 1.3 hours of incident sunlight. The scale at the daylight-hour switch 154 is calibrated to 1.3×3 or 4 hours. By installing the solar powered lamp 100,100a,100b at a location that has 4 hours of incident sunlight, the lamp will light up with a consistent predetermined brightness throughout the night. If the lamp is installed at a location with 10 hours of incident sunlight, the sunlight-hour switch is set to 10 hours; at this setting, the LED consumes 15 mA/h and illuminates a diameter of 2.8 m around the lamp, and it will take about 3.24 hours to recharge and replenish one night of current consumption by the LED. To compensate for bad weather at the rate of 3 to 1, the scale at the sunlight-hour switch 154 is calibrated to 10 hours.

Table 2 shows performance of the solar powered lamp equipped with a 115×162 mm² solar panel and operated for about 14 hours. In this example, the batteries 150 are rated at 2600 mA capacity and are connected in series. The solar powered lamp 100,100a,100b using this solar panel size is suitable for use in places further away from the equator where there is sunny weather at least one third of the time and the nights are 14 hours long.

TABLE 2

Performance of solar powered lamp equipped with 115 × 162 mm² solar panel

| LED Consumption rate (mA/h) | Charging rate (h) | Illumination diameter (m)(ft) | Battery reserve (h) |
|---|---|---|---|
| 10 | 0.82 | 2.7 (8.8) | 233 |
| 15 | 1.23 | 2.8 (9.1) | 155 |
| 20 | 1.64 | 2.9 (9.5) | 117 |
| 25 | 2.05 | 3.0 (9.8) | 92 |
| 30 | 2.46 | 3.2 (10.4) | 76 |

The manner of calibrating the sunlight-hour switch 154 on the solar powered lamp with the 115×162 mm² solar panel is similar to that used in the previous example, and no further explanation is necessary.

While specific embodiments have been described and illustrated, it is understood that many changes, modifications, variations and combinations thereof could be made to the present invention without departing from the scope of the invention.

The invention claimed is:

1. A solar powered lamp comprising:
    a solar panel;
    a light sensor integrally built-in with the solar panel with predetermined dusk to dawn settings;
    a control circuit comprising a battery charger, a brightness adjust circuit and an ON/OFF circuit;
    a sunlight-hour switch connected to the brightness adjust circuit and ON/OFF circuit;
    an LED bulb; and
    a rechargeable battery connected to the battery charger;
    wherein the sunlight-hour switch is calibrated with a scale graduated according to the number of hours of sunlight incident on the solar panel to enable a user to adjust the sunlight-hour switch so that the solar powered lamp is operable to replenish charges in the rechargeable battery during the day and to illuminate at an optimum brightness consistently and continuously from dusk to dawn.

2. A solar powered lamp according to claim 1, wherein calibration of the sunlight-hour switch comprises a weather variability compensation factor being applied to a capacity of the battery charger.

3. A solar powered lamp according to claim 1, wherein the control circuit further comprises an under-voltage protection circuit disposed between the battery charger and the brightness adjust circuit, wherein the under-voltage protection circuit prevents charges in the battery from dissipating through the battery charger and solar panel.

4. A solar powered lamp according to claim 1, wherein the graduated scale comprises a bar indicator.

5. A solar powered lighting kit comprising:
    a lamp comprising a lampshade and a cap assembly disposed on top of the lampshade;
    a solar panel with an integral light sensor operable to mount on top of the cap assembly;
    an LED bulb;
    a control board comprising a battery charger and an LED controller, with the LED controller comprising a brightness adjust circuit and an ON/OFF circuit; and
    a sunlight-hour switch calibrated with a scale graduated in hours according to number of hours of sunlight incident on the solar panel to enable a user to adjust the sunlight-hour switch, thereby allowing the solar powered lamp to replenish a rechargeable battery during daylight and allowing the lamp to illuminate at an optimum brightness consistently and continuously from dusk to dawn.

6. A lighting kit according to claim 5, wherein the LED controller further comprises an under-voltage protection circuit, wherein the under-voltage protection circuit prevents charges in the battery from dissipating through the battery charger and solar panel when the lighting kit is assembled.

* * * * *